US012779515B2

(12) United States Patent
Mondal et al.

(10) Patent No.: US 12,779,515 B2
(45) Date of Patent: Nov. 3, 2026

(54) METHOD FOR MANUFACTURING A RECYCLABLE ARTICLE FROM MUNICIPAL SOLID WASTE

(71) Applicant: TRASHCON LABS PRIVATE LIMITED, Bangalore (IN)

(72) Inventors: Swaraj Mondal, Port Blair (IN); Saurabh Jain, Bangalore (IN); Nivedha Raghavan Madhubala, Bijapur (IN)

(73) Assignee: TRASHCON LABS PRIVATE LIMITED, Bangalore (IN)

( * ) Notice: Subject to any disclaimer, the term of this patent is extended or adjusted under 35 U.S.C. 154(b) by 654 days.

(21) Appl. No.: 18/032,430

(22) PCT Filed: Oct. 19, 2021

(86) PCT No.: PCT/IB2021/059605
§ 371 (c)(1),
(2) Date: Apr. 18, 2023

(87) PCT Pub. No.: WO2022/084843
PCT Pub. Date: Apr. 28, 2022

(65) Prior Publication Data

US 2023/0381839 A1 Nov. 30, 2023

(30) Foreign Application Priority Data

Oct. 19, 2020 (IN) ............................ 202041045486

(51) Int. Cl.
*B09B 3/32* (2022.01)
*B09B 3/20* (2022.01)
(Continued)

(52) U.S. Cl.
CPC .................. *B09B 3/32* (2022.01); *B09B 3/20* (2022.01); *B09B 3/35* (2022.01); *B09B 3/38* (2022.01); *B09B 3/40* (2022.01)

(58) Field of Classification Search
CPC .... B09B 3/20; B09B 3/32; B09B 3/40; B29C 43/003
See application file for complete search history.

(56) References Cited

U.S. PATENT DOCUMENTS 4,234,632 A * 11/1980 Lubowitz .................. G21F 9/34 588/256
5,649,323 A * 7/1997 Kalb ......................... G21F 9/36 976/DIG. 383

(Continued)

FOREIGN PATENT DOCUMENTS

EP 0180531 A1 * 5/1986 ................ C10L 5/48
WO WO2014/033502 * 3/2014

OTHER PUBLICATIONS

Machine translation (Espacenet) of EP 0,180,531 A1. Translated Sep. 6, 2025. (Year: 2025).*

*Primary Examiner* — Edmund H Lee
(74) *Attorney, Agent, or Firm* — Amster, Rothstein & Ebenstein LLP

(57) ABSTRACT

A method for manufacturing a recyclable article from municipal solid waste (MSW) without addition of binders is disclosed. The method includes aspects of processing, a proportionate quantity of biodegradable waste and non-biodegradable waste to form a mixture. The processed mixture is loaded into a mould placed in a melter (9). The processed mixture is subsequently melted in the melter (9) at a pre-determined temperature and pre-determined pressure, where the non-biodegradable waste circumscribes and form a bond with the biodegradable waste during melting. The melted mixture is compressed in a compression mould- (Continued)

ing device (10) at a pressure ranging from 0.1 Kg/cm$^2$ to 3.0 Kg/cm$^2$. Further, the compression of the melted mixture is carried out under supply of a coolant for solidifying and forming the article.

12 Claims, 4 Drawing Sheets

(51) Int. Cl.

| | |
|---|---|
| ***B09B 3/35*** | (2022.01) |
| ***B09B 3/38*** | (2022.01) |
| ***B09B 3/40*** | (2022.01) |

(56) References Cited

U.S. PATENT DOCUMENTS 5,962,630 A * 10/1999 O'Brien .................. G21F 9/307 528/381
9,978,470 B2 * 5/2018 Gelis ....................... G21F 9/165

* cited by examiner

METHOD FOR MANUFACTURING A RECYCLABLE ARTICLE FROM MUNICIPAL SOLID WASTE

TECHNICAL FIELD

Present disclosure relates to the field of recycling of wastes. Particularly, but not exclusively, the present disclosure relates to a method of recycling municipal solid waste (MSW). Further, embodiments of the present disclosure relate to the method of processing or recycling the municipal solid waste to form recyclable articles without the use of any external binding agents to or any other additional raw materials.

BACKGROUND

In general, commercial, industrial, and residential establishments generate large amounts of throw-away waste and waste products and such waste is generally categorized as municipal solid waste (MSW). Such municipal solid waste needs to be recycled in a way that does not cause environmental hazards. Generally, waste is recycled by separating the non-biodegradable materials such as plastics from the biodegradable materials. It is a tedious task to segregate the solid waste generated from residential and commercial establishments, as it may require abundant infrastructure such as, but not limited to, a number of waste collection bins, a management system to organize collection of solid waste, and the like. In addition, at the households or community level, there may not be adequate awareness in terms of waste management, due to lack of knowledge pertaining to nature of waste, and the manner of categorizing thereto.

Conventionally, solid waste may be disposed by dumping waste in a land fill or through incineration process. However, such methods of disposal of the solid waste may result in pollution of the environment, such as, but not limited to, contamination of soil, water, air etc. and such reckless dumping of waste or incineration of waste is prohibited by law. In addition, there are certain environmental restrictions as well, for the landfills, in dumping the solid waste. Further, incineration treatment is disadvantageous as solid waste containing plastics in a large proportion are incinerated and furnace of the incinerator would be damaged. Consequently, gas treating device is required as an accessory to an incinerator treatment, which produces secondary waste materials from the accessory device, thereby incurring an extra expense for installation of the accessory device.

Further, single-use plastics and multi-layered plastics have created havoc and have been a major concern. As mentioned above, due to lack of any alternative, it is imperative to find solutions to recycle and reuse the same. Also, most of these materials are mixed with biodegradable components such as food waste, diapers, sanitary napkins etc. as a general way of disposing waste from most of the households. Currently solutions to this include burning the waste in cement plants as a form of fuel or burning it in waste to energy plants to generate energy. However, as this waste is generally wet and not segregated, the available solutions are not sustainable.

Further, recycling of the single-use or multi-layered plastics or the k of waste takes place with only one component at a time and is not cost-effective. There are multiple operators who recycle tetra packs, but the same technology cannot be used for single-use plastics or contaminated plastics or any non-biodegradable material in general. Further most of the technologies in recycling cater to recyclable plastics of single type such as HDPE, PP, PVC etc. Single-use, multi-layered and contaminated plastics/non-biodegradable materials are simply dumped or burnt causing diseases and all kinds of pollution. Most of the existing recycling solutions use water to clean the plastics that are brought in thus, contaminating water as a resource. The existing methods also make use of resin to process the waste into a useful component. More often, the resin is mixed with the waste while recycling so that the resin acts as a hinder and holds together all other waste particles and additional costs are incurred with the usage of resin.

The present disclosure is directed to overcome one or more limitations stated above or any other limitation associated with the conventional systems.

SUMMARY OF THE DISCLOSURE

The shortcomings of the conventional mechanisms are overcome, and additional advantages are provided through the provision of a system(s) or mechanism(s) as disclosed in the present disclosure.

Additional features and advantages are realized through the techniques of the present disclosure. Other embodiments and aspects of the disclosure are described in detail herein and are considered a part of the disclosure.

In one non-limiting embodiment of the disclosure, a method for manufacturing a recyclable article from municipal solid waste (MSW) without addition of binders is disclosed. The method includes aspects of processing, a proportionate quantity of biodegradable waste and non-biodegradable waste from a municipal solid waste (MSW) to form a mixture. The processed mixture is loaded into a mould placed in a melter. Further, the processed mixture is melted in the inciter at a pre-determined temperature and pre-determined pressure, where the non-biodegradable waste, circumscribe and form a bond with the biodegradable waste during melting. The melted mixture is compressed in a compression moulding device at a pressure ranging from 0.1 $Kg/cm^2$ to 3.0 $Kg/cm^2$. Lastly, compression of the melted mixture is subjected to supply of a coolant to for solidifying and forming the article.

In an embodiment of the disclosure, the processed mixture is obtained by a method that includes steps of mixing, proportionate quantity of the biodegradable waste and non-the biodegradable waste in a mixer. The mixed biodegradable waste and non-the biodegradable waste is grinded in a grinder such that the biodegradable waste is grinded to a powdered form and the non-biodegradable waste is grinded to flakes. The grinded waste is extruded in an extruder where, the non-biodegradable waste liquefies and bonds with the biodegradable waste. Further, the extruded waste is grinded in a second grinder, into pellets of processed waste.

In an embodiment of the disclosure, the temperature of the extruder in a region where the grinded waste is fed to the extruder, ranges from 100° C. to 350° C.

In an embodiment of the disclosure, the temperature of a region in the extruder where the non-biodegradable waste bonds with the biodegradable waste ranges from 110° C. to 350° C.

In an embodiment of the disclosure, the mould is placed inside the melter for a time period up to 60 minutes.

In an embodiment of the disclosure, the proportionate quantity includes up to 50% of biodegradable waste.

In an embodiment of the disclosure, the density of processed mixture from the second grinder ranges from 0.1 $g/cm^3$ to 0.5 $g/cm^3$.

In an embodiment of the disclosure, the processed mixture is uniformly distributed in the mould placed in the melter by at least one vibrating plate accommodated below the mould.

In an embodiment of the disclosure, the waste is compressed in the compression moulding device for a time period up to 60 minutes.

In an embodiment of the disclosure, the grinded waste is extruded in a screw type extruder.

In an embodiment of the disclosure, the pre-determined temperature ranges from 170° C. to 350° C. and the pre-determined pressure ranges from 0.1 $Kg/cm^2$ to 3 $Kg/cm^2$.

In an embodiment of the disclosure, compressing the melted mixture in the compression moulding device includes hot pressing and subsequently cold pressing the melted mixture.

In another non-limiting embodiment of the disclosure, 13. A recyclable article manufactured from municipal solid waste (MSW) is disclosed. The article includes a body with a proportionate quantity of processed mixture of biodegradable waste and non-biodegradable waste to include a density ranging from 0.5 $g/cm^3$ to 1.5 $g/cm^3$. The body is manufactured by a method that includes aspects of processing, a proportionate quantity of biodegradable waste and non-biodegradable waste from a municipal solid waste (MSW) to form a mixture. The processed mixture is loaded into a mould placed in a melter. Further, the processed mixture is melted in the inciter at a pre-determined temperature and pre-determined pressure, where the non-biodegradable waste, circumscribe and form a bond with the biodegradable waste during melting. The melted mixture is compressed in a compression moulding device at a pressure ranging from 0.1 $Kg/cm^2$ to 3.0 $Kg/cm^2$. Lastly, compression of the melted mixture is subjected to supply of a coolant to for solidifying and forming the article.

In an embodiment of the disclosure, forming of the articles includes trimming and dimensioning for manufacturing the article, and wherein trimmed material from the formed article are added with the proportionate quantity of biodegradable waste and non-biodegradable waste for processing and manufacturing the article.

The foregoing summary is illustrative only and is not intended to be in any way limiting. In addition to the illustrative aspects, embodiments, and features described above, further aspects, embodiments, and features will become apparent by reference to the drawings and the following description.

BRIEF DESCRIPTION OF THE ACCOMPANYING FIGURES

The above-mentioned aspects, other features and advantages of the disclosure will be better understood and will become more apparent by referring to the exemplary embodiments of the disclosure, as illustrated in the accompanying drawings.

Figure 1:
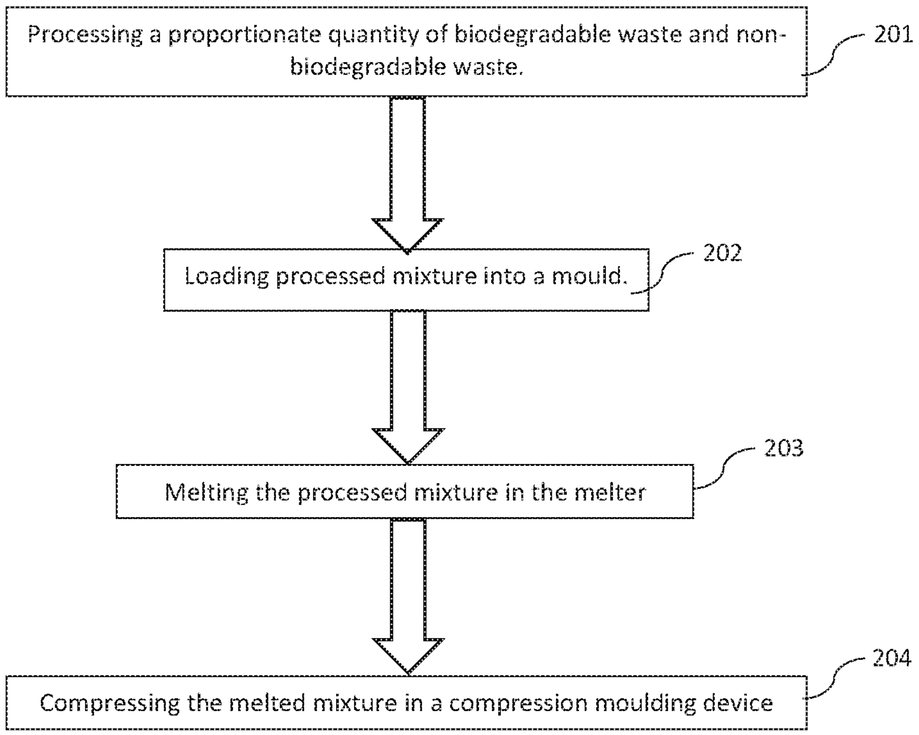
FIG. 1 illustrates a flowchart of a method of recycling municipal solid waste, in accordance with an embodiment of the disclosure.

The figures depict embodiments of the disclosure for purposes of illustration only. One skilled in the art will readily recognize from the following description that alternative embodiments of the method illustrated herein may be employed without departing from the principles of the disclosure described herein.

DETAILED DESCRIPTION

The foregoing has broadly outlined the features and technical advantages of the present disclosure in order that the description of the disclosure that follows may be better understood. Additional features and advantages of the claimed disclosure will be described hereinafter which form the subject of the disclosure. It should be appreciated by those skilled in the art that the conception and specific embodiments disclosed may be readily utilized as a basis for modifying or designing other system for carrying out the same purposes of the present disclosure. It should also be realized by those skilled in the art that such equivalent constructions do not depart from the scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

While the disclosure is susceptible to various modifications and alternative forms, specific embodiments thereof have been shown by way of example in the drawings and will be described below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof used in the disclosure, are intended to cover a non-exclusive inclusions, such that an assembly comprises a list of components does not include only those components but may include other components not expressly listed or inherent to such assemblies. In other words, one or more elements in assemblies proceeded by "comprises" does not, without more constraints, preclude the existence of other elements or additional elements in the system or device.

The following paragraphs describe the present disclosure with reference to FIGS. 1 to 4. In the figures, the same element or elements which have similar functions are indicated by the same reference signs. For the purposes of promoting an understanding of the principles of the disclosure, reference will now be made to specific embodiments illustrated in the drawings and specific language will be used to describe the same. It will nevertheless be understood that no limitation of the scope of the disclosure is thereby intended, such alterations and further modifications in the illustrated methods, and such further applications of the principles of the disclosure as illustrated therein being contemplated as would normally occur to one skilled in the art to which the disclosure pertains.

The following detailed description is merely exemplary in nature and is not intended to limit application and uses. Further, there is no intention to be bound by any theory presented in the preceding background or summary or the following detailed description. It is to be understood that the disclosure may assume various alternative orientations and step sequences, except where expressly specified to the contrary. It is also to be understood that the specific devices or components illustrated in the attached drawings and described in the following specification are simply exemplary embodiments of the inventive concepts defined in the appended claims. Hereinafter, preferred embodiments of the present disclosure will be described referring to the accompanying drawings. While some specific terms directed to a specific direction will be used, the purpose of usage of these terms or words is merely to facilitate understanding of the present invention referring to the drawings.

Accordingly, it should be noted that meaning of these terms or words should not improperly limit the technical scope of the present disclosure. Also, it is to be understood that the phraseology and terminology used herein is for the purpose of description and should not be regarded as limiting. It is to be understood that this disclosure is not limited to the specific devices, methods, applications, conditions, or parameters described and/or shown herein, and that the terminology used herein is for the purpose of describing particular embodiments by way of example and is not intended to be limiting of the claimed invention. In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Figure 2:
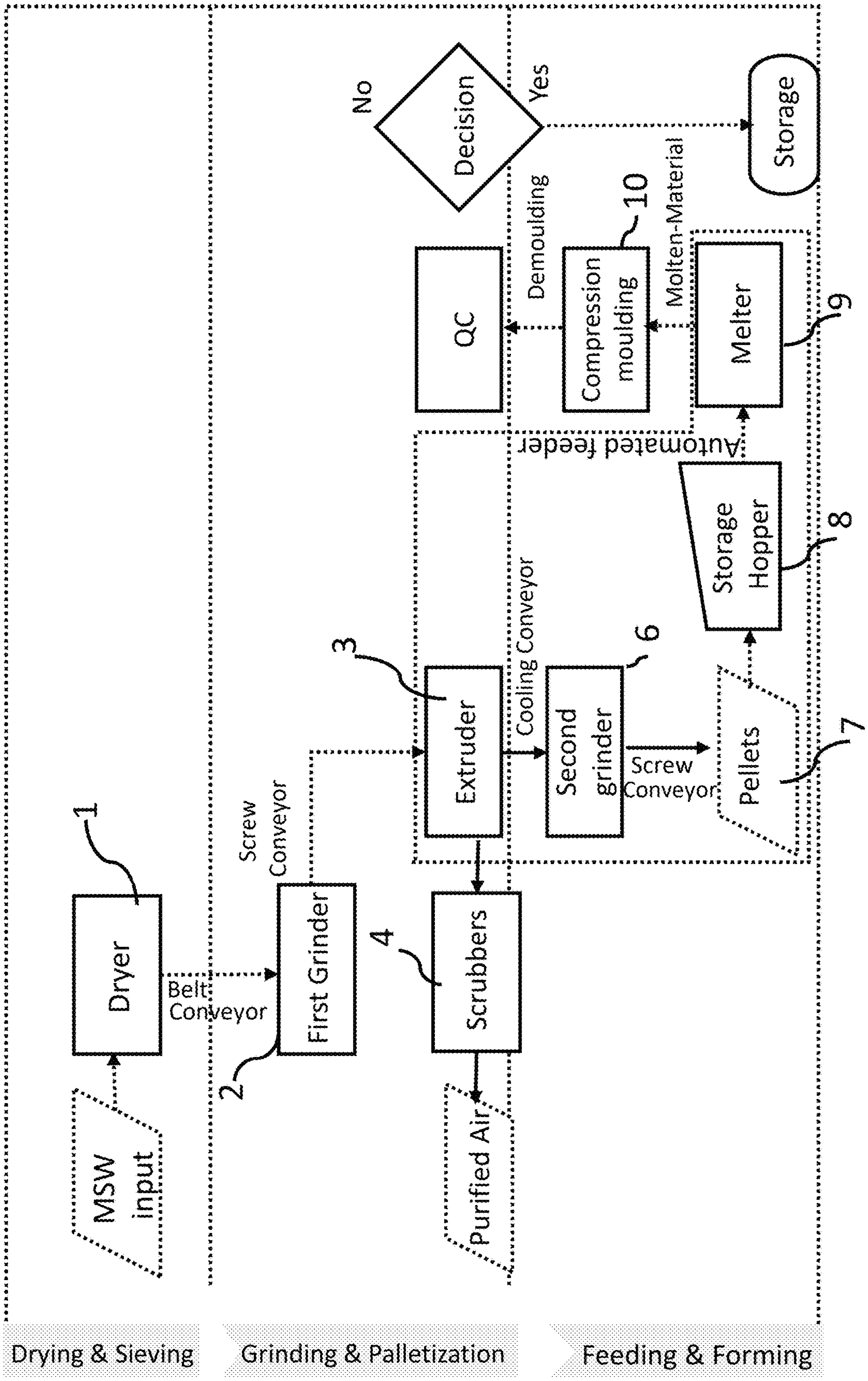
FIG. 2 illustrates a flow diagram of a method of recycling municipal solid waste, in accordance with an embodiment of the disclosure.

FIG. 1 illustrates a flowchart for a method of recycling municipal solid waste (MSW) and FIG. 2 illustrates a flow diagram for the method of recycling MSW. MSW is trash or garbage which consists of items that are thrown away, such as product packaging, grass clippings, furniture, clothing, bottles, food waste, newspapers, appliances, paint, batteries etc. MSW is a mixture of biodegradable and non-biodegradable materials. The non-biodegradables include all types of plastics, metals, polymers etc. The biodegradables herein may be the dried biodegradables such as straws, lignin, stubble, crop residue, dry leaves, paper (Does not include food waste/extremely wet biodegradable waste). The biodegradables may however have droplets of liquid and other biodegradable contaminants. The biodegradable waste that is used for processing may preferably be up to 50% of the total waste. The first step 201 involves the aspect of initially feeding the waste to a dryer (1) where a significant amount of moisture loss takes place which makes it ideal for the further processing. In an embodiment, the dryer (1) is a rotary drum dryer and the moisture content of the waste fed into the dryer (1) may be significantly reduced before processing the waste. The waste may be dried such that the water content in the waste is reduced to around 1% to 2% of the total weight of the waste. The dried waste from the dryer (1) is fed to a mixer where proportionate quantity of biodegradable waste and non-biodegradable waste are processed to form a mixture. In an embodiment, any known mixers or blending systems may be used for mixing the biodegradable and the non-biodegradable waste. The processed mixture may be loaded onto a first grinder (2) through a belt conveyor. In an embodiment, the MSW may be de-dusted before being fed to the dryer (1) by any de-dusting methods known in the art.

The waste is grinded to homogenize and reduce the size in the first grinder (2). The output from the first grinder (2) may appear as flakes. The non-biodegradable waste may have reduced into flake-like substance whereas the biodegradable waste would disintegrate to a powdered form. A sieve or mesh like screen may be provided at an outlet of the first grinder (2) such that the waste output from the first grinder (2) is instantly separated. The non-biodegradable flakes may be collected on top of the mesh and the biodegradable powdered waste may seep through the mesh and may be collected in a container below the sieve or the mesh. Once, the waste is grinded, the biodegradable and non-biodegradable material may be separated by use of a filter screen and then mixed again in a desirable ratio based on the specification or application of the article. Optionally, grinded waste from a different source may be readily used in the process of the present disclosure. The grinded waste is then fed into an extruder (3) for densification. In an embodiment, the extruder (3) may be a screw type extruder and may include a heated barrel with single or multiple rotating screws. A single extruder (3) or combinations of extruders (3) (such as in tandem extrusion) which may be any one of the extruders known in the plastics industry, including, without being limited thereto, single screw extruder, tapered twin extruder, tapered twin single extruder, twin screw extruder, multi-screw extruder may be used.

The grinded waste from the first grinder (2) is fed into the extruder (3) by means of a conveyor [not shown]. In an embodiment, the conveyor is a screw conveyor. The grinded waste enters the extruder (3) and is conveyed through the barrel by the rotary motion of the screw. The temperature of the extruder (3) in the feeding region may range from 100° C. to 350° C. and is preferably 130° C. As the grinded waste is conveyed through the barrel by the rotary motion of the screw, the grinded waste may be compressed between the surface of the screw and an internal surface of the barrel. While in the extruder (3), the powdered biodegradable waste tends to come in the middle while the non-degradable or plastics flake like substance circumscribe the powdered biodegradable waste. As the screw rotates, the friction between the grinded waste, the barrel and screw surfaces cause the temperature of the grinded waste to increase. Further, the barrel of the extruder (3) may also be heated externally along a pre-determined region defined as the metering region of the extruder (3). Further, due to the frictional forces and the external heating of the barrel, the overall temperature of the extruder (3) along the metering region may also range from 110° C. to 350° C. and is preferably 140° C. Consequently, the plastic or the flake-like non-biodegradable waste in the waste material melts and binds all other material in the waste. The high temperature and high pressure inside the extruder (3) cause the flake-like non-biodegradable waste to liquefy and bond with the powdered biodegradable waste. The flake-like non-biodegradable waste acts as a binder and since the plastic is subjected to high temperatures and high pressure, the plastic melts and holds the other waste particles together. At the end of this process, various pieces of raw material appear as discrete, dense materials and have lost their original texture. The dense material that is extruded from the extruder (3) is in the form of a thick paste. The dense material may be passed through a series of conveyors where the material is allowed to be cooled.

Further, the extruder (3) often generates toxic fumes during heating and pressurizing the grinded waste. Theses fumes may be treated before being released to the atmosphere. The fumes from the extruder (3) may be guided to a plurality of scrubbers (4). The scrubbers (4) may be a standard air pollution control device that can be used to remove particulates and purify toxic gases. The purified air from the scrubbers (4) may then be released to the atmosphere.

After the extrusion process, the dense extruded waste is cooled by passing through a series of conveyors. The extruded waste from the extruder (3) may further be directed to a second grinder (6). The second grinder (6) grinds the extruded waste to uniform sized pellets (7) of processed waste mixture [hereinafter referred to as "pellets"] that enhance the quality of the output material i.e., recycled articles. The density of the pellets (7) may range from 0.1 $g/cm^3$ to 0.5 $g/cm^3$, preferably at 0.28 $g/cm^3$. The output from the second grinder (6) is conveyed to a storage hopper (8) by means of a screw conveyor.

The pellets (7) of required quantity may be drawn from the storage hoppers (8) and may further be processed to create the article of required shape. The step 202 involves the aspect of feeding the pellets (7) into a mould and may further be covered with an antimould after the mould is filled to the required level. The pellets (7) are filled into the mould such that the pellets (7) are uniformly distributed inside of the mould. In an embodiment, vibrating plates may be used to uniformly distribute the pellets (7) inside the mould. The mould along with the antimould may further be placed inside a melter (9). The step 203 involves the aspect of the melter (9) heating the pellets (7) and melter (9) operates at a temperature ranging from 170° C.-350° C., preferably at 190° C. The melter (9) liquefies the pellets (7) and a pressure ranging from 0.1 $Kg/cm^2$ to 3 $Kg/cm^2$ is simultaneously applied to the mould while the pellets (7) are being liquefied. The pressure may be applied onto the liquefying pellets (7) while heating the pellets (7) by means of a moulding press. The applied pressure facilitates the liquefying pellets (7) to be evenly distributed across the mould. The mould may be placed inside the melter (9) for a time period up to 60 minutes, preferably 30 minutes.

After completion of the inciting process, the mould with the liquefied pellets (7) moves into the compression moulding machine (10) at the step 204. Further, a large amount of pressure ranging from 0.1-3.0 $Kg/cm^2$, preferably 1.3 $Kg/cm^2$ may be applied onto the liquefied pellets (7). The pressure applied onto the liquefying pellets (7) in the mould may be generated by hydraulic moulding press or by any other means known in the art. The pressure applied onto the liquefying pellets (7) may range for a time period up to 60 minutes. Simultaneously, a heat exchanging process may be configured around the mould. The heat exchanging process may be configured using a closed looped coolant circulation system around the mould. The coolant circulation system [not shown] removes the heat from the mould and thereby allows the liquefied pellets to solidify inside the mould to form the article. When the cooling process is completed, the mould moves to the de-moulding process. A magnetic crane may lift the antimould followed by a vacuum lifter, which removes the article out of the mould. The empty mould with the antimould returns for its next cycle. The article may further be subjected to a quality check and if the article is of unsatisfactory quality standards, the article may further be re-processed by feeding the article to the first grinder (2).

Figure 3:
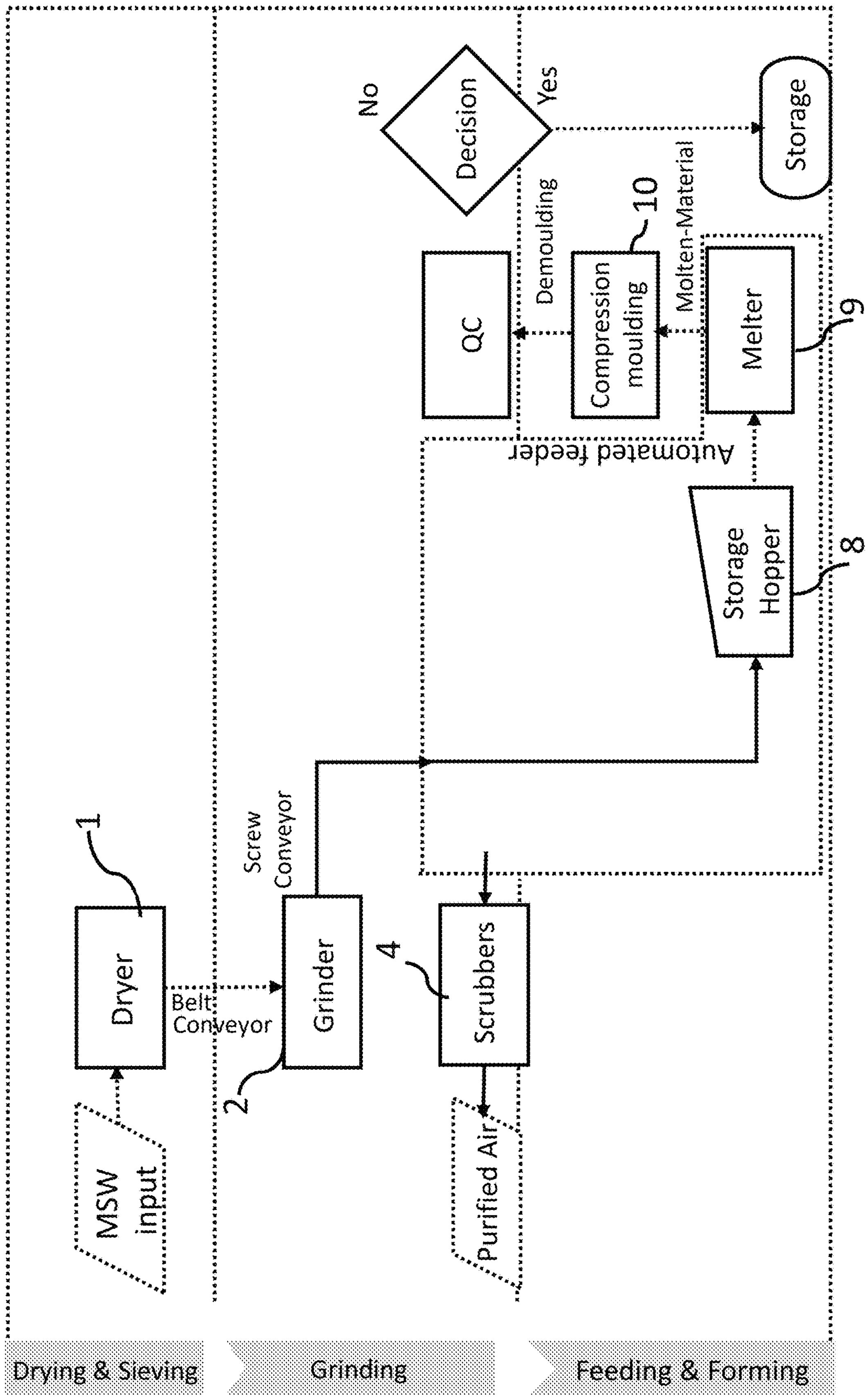
FIG. 3 illustrates a flow diagram of another embodiment of a method for recycling municipal solid waste, in accordance with an embodiment of the disclosure.

Further, FIG. 3 illustrates a flowchart of another embodiment of a method for recycling MSW. Similar to the above-mentioned process, the MSW including biodegradable and non-biodegradable waste is initially fed to the dryer (1) where a significant amount of moisture loss of the MSW takes place. The dried waste from the dryer (1) may be fed to a mixer where proportionate quantity of biodegradable and non-biodegradable waste is processed. The processed waste is loaded onto a grinder (2) through a belt conveyor. The non-biodegradable material in the dried waste may have reduced into flake-like substance whereas the biodegradable material would disintegrate to a powdered form. Once, the waste is grinded, the biodegradable and non-biodegradable material may be separated by use of a filter screen and then mixed again in a desirable ratio based on the specification or application of the article. The grinded waste from the grinder (2) is conveyed to a storage hopper (8) by means of a screw conveyor.

The grinded waste of required quantity may be drawn from the storage hoppers (8) and may further be processed to create the article. The grinded waste may be fed into the mould and may further be covered with the antimould after the mould is filled to the required level. The grinded waste is filled into the mould such that the grinded waste are uniformly distributed inside of the mould. In an embodiment, vibrating plates may be used to uniformly distribute the grinded waste inside the mould. The mould along with the antimould may further be placed inside the melter (9). The melter (9) heats the grinded waste and operates at the temperature ranging from 170° C.-350° C., preferably at 190° C. The melter (9) liquefies the grinded waste and a pressure ranging from 0.1 $Kg/cm^2$ to 3 $Kg/cm^2$ is simultaneously applied to the mould while the grinded waste is being liquefied. The pressure may be applied onto the liquefying waste while heating the waste by means of a moulding press. The applied pressure facilitates the liquefying waste to be evenly distributed across the mould. The mould may be placed inside the melter (9) for a time period up to 60 minutes, preferably 30 minutes. The non-degradable or plastics flake like substance circumscribe the powdered biodegradable waste inside the melter (9). The plastic or the flake-like non-biodegradable waste melts and binds all other material in the waste. The high temperature and high pressure inside the inciter (9) cause the flake-like non-biodegradable waste to liquefy and bond with the powdered biodegradable waste. The flake-like non-biodegradable waste act as a binder and since the plastic is subjected to high temperatures and high pressure, the plastic melts and holds the other waste particles together.

After completion of the melting process, the mould with the liquefied grinded waste moves into the compression moulding machine (10). Further, a large amount of pressure ranging from 0.1-3.0 $Kg/cm^2$, preferably 1.3 $Kg/cm^2$ may be applied onto the grinded waste. The pressure applied onto the liquefying grinded waste in the mould may be generated by hydraulic moulding press or by any other means known in the art. The pressure applied onto the liquefying grinded waste may range for a time period upwards of 20 minutes and preferably 30 minutes. Simultaneously, the heat exchanging process may be configured around the mould. The heat exchanging process may be configured using a closed looped coolant circulation system around the mould. The coolant circulation system removes the heat from the mould and thereby allows the liquefied grinded waste to solidify inside the mould to form the article. When the cooling process is completed, the mould moves to the de-moulding process. A magnetic crane may lift the antimould followed by a vacuum lifter, which removes the article out of the mould. The empty mould with the antimould returns for its next cycle. The article may further be subjected to a manual quality check and if the article is of unsatisfactory quality standards, the article may further be re-processed by feeding the article to the grinder (2). The forming of the articles includes trimming and dimensioning for manufacturing the article. The article after being compressed may be subjected to finishing operations by trimming operations.

The trimmed material from the formed article are added with the proportionate quantity of biodegradable waste and non-biodegradable waste for processing and manufacturing the article.

Figure 4:
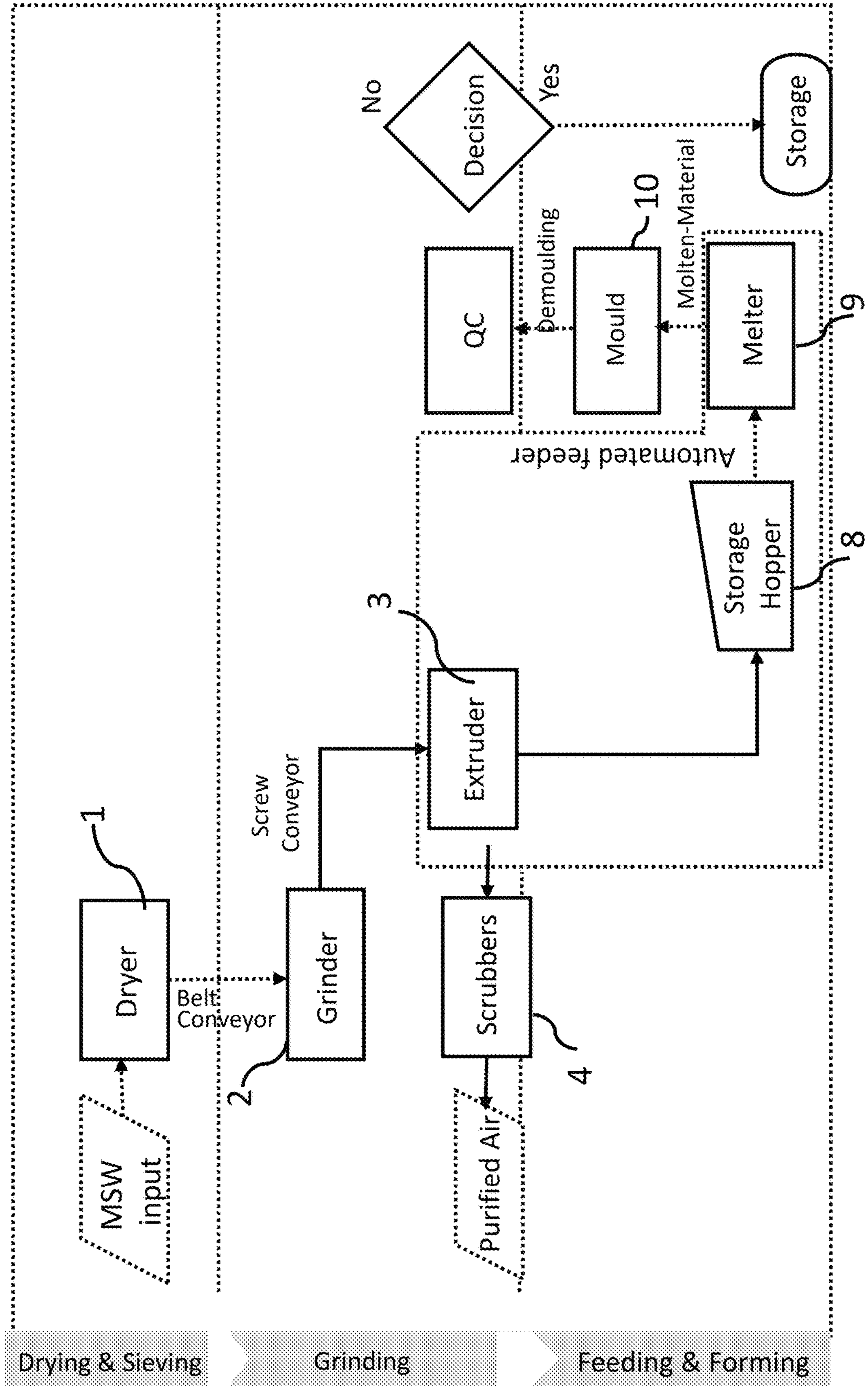
FIG. 4 illustrates a flow diagram of another embodiment of a method for recycling municipal solid waste, in accordance with an embodiment of the disclosure.

FIG. 4 illustrates a flowchart of another embodiment of a method for recycling MSW. Similar to the above-mentioned process, the MSW including biodegradable and non-biodegradable waste is initially fed to the dryer (1) where a significant amount of moisture loss of the MSW takes place. The dried waste from the dryer (1) may be fed to a mixer where proportionate quantity of biodegradable and non-biodegradable waste is processed. The processed waste is loaded onto a grinder (2) through a belt conveyor. The non-biodegradable material in the dried waste may have reduced into flake-like substance whereas the biodegradable material would disintegrate to a powdered form. Once, the waste is grinded, the biodegradable and non-biodegradable material may be separated by use of a filter screen and then mixed again in a desirable ratio based on the specification or application of the article.

The grinded waste from the grinder (2) is fed into the extruder (3) by means of a conveyor. The grinded waste enters the extruder (3) and is conveyed through the barrel by the rotary motion of the screw. The temperature of the extruder (3) in the feeding region may range from 100° C. to 350° C. and is preferably 130° C. As the grinded waste is conveyed through the barrel by the rotary motion of the screw, the grinded waste may be compressed between the surface of the screw and an internal surface of the barrel. While in the extruder (3), the powdered biodegradable waste tends to come in the middle while the non-degradable or plastics flake like substance circumscribe the powdered biodegradable waste. As the screw rotates, the friction between the grinded waste, the barrel and screw surfaces cause the temperature of the grinded waste to increase. Further, the barrel of the extruder (3) may also be heated externally along a pre-determined region defined as the metering region of the extruder (3). Further, due to the frictional forces and the external heating of the barrel, the overall temperature of the extruder (3) along the metering region may also range from 110° C. to 350° C. and is preferably 140° C. Consequently, the plastic or the flake-like non-biodegradable waste in the waste material melts and binds all other material in the waste. The high temperature and high pressure inside the extruder (3) cause the flake-like non-biodegradable waste to liquefy and bond with the powdered biodegradable waste. The flake-like non-biodegradable waste acts as a binder and since the plastic is subjected to high temperatures and high pressure, the plastic melts and holds the other waste particles together. At the end of this process, various pieces of raw material appear as discrete, dense materials and have lost their original texture. The dense material that is extruded from the extruder (3) is in the form of a thick paste. The dense material or the extruded material may directly be loaded into the mould. The material that is extruded and loaded from the extruder into the mould may be in a molten state. The molten extruded material flows into the mould and occupies the shape of mould. The extruder (3) may continue to extrude or densify the extruded material in the mould. The extruded material may be loaded in the mould until the pressure of the extruded material in the load reaches 0.1-3.0 $Kg/cm^2$. In this particular embodiment, the mould may be a closed system with a single inlet. Consequently, the extruded material may be loaded and densified within the mould unit the required pressure is reached within the mould. The mould may be subsequently cooled after the molten extruded material is loaded into the mould. The extruded material may be cooled by the closed looped coolant circulation system that is configured around the mould. The coolant circulation system removes the heat from the mould and thereby allows the extruded waste to solidify inside the mould to form the article. When the cooling process is completed, the mould moves to the de-moulding process where the article is removed from the mould. The article may further be subjected to a manual quality check and if the article is of unsatisfactory quality standards, the article may further be re-processed by feeding the article to the grinder (2).

In an embodiment, the MSW may be used to form articles such as boards or panels which may be used for making various components. In an embodiment, the mould may be of different shapes other than a standard rectangular shape of the board.

In an embodiment, boards as large as 8 feet in width, 4 feet in length may be manufactured by recycling, the MSW in the above-mentioned manner and the board thickness may range from 6 mm to 24 mm, preferably maintained at 17 mm. In an embodiment, the density of the boards may range from 0.5 to $g/cm^3$, preferably 1 $g/cm^3$.

In an embodiment, the boards are manufactured without the use of additional binders such as resin or substrate and the non-biodegradable flakes or plastics act as a binding agent.

In an embodiment, simultaneously applying pressure to the mould while the pellets are being liquefied ensures that the liquefying pellets (7) to conform to the shape of the mould.

Equivalents

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims e.g., bodies of the appended claims are generally intended as "open" terms e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" e.g., "a" and/or "an" should typically be interpreted to mean "at least one" or "one or more"; the same holds true for the use of definite articles used to introduce claim recitations. In addition, even if a specific number of an introduced claim recitation is explicitly recited, those skilled in the art will recognize that such recitation should typically be interpreted to mean at least the recited number e.g., the bare recitation of "two recitations," without other modifiers, typically means at least two recitations, or two or more recitations. Furthermore, in those instances where a convention analogous to "at least one of A, B, and C, etc." is used, in general such a construction is intended in the sense one having skill in the art would understand the convention e.g., "a system 108 having at least one of A, B, and C" would include but not be limited to systems that have A alone, B alone, C alone, A and B together, A and C together, B and C together, and/or A, B, and C together, etc. In those instances, where a convention analogous to "at least one of A, B, or C, etc." is used, in general such a construction is intended in the sense one having skill in the art would understand the convention e.g., "a system 108 having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Description | Referral numerals |
|---|---|
| Dryer | 1 |
| First grinder | 2 |
| Extruder | 3 |
| Scrubbers | 4 |
| Second grinder | 6 |
| Pellets | 7 |
| Storage hopper | 8 |
| Melter | 9 |
| Compression moulding | 10 |

We claim:

1. A method for manufacturing a recyclable article from municipal solid waste (MSW) without addition of binders, the method comprising:

processing, a proportionate quantity of biodegradable waste and non-biodegradable waste from a municipal solid waste (MSW) to form a mixture;

loading, the mixture into a mould placed in a melter (9);

melting, the mixture in the melter (9) at a pre-determined temperature and pre-determined pressure, wherein the non-biodegradable waste, circumscribe and form a bond with the biodegradable waste during melting;

compressing the melted mixture in a compression moulding device (10) at a pressure ranging from 0.1 $Kg/cm^2$ to 3.0 $Kg/cm^2$, compression of the melted mixture is subjected under supply of a coolant for solidifying and forming the article.

2. The method as claimed in claim 1, wherein the mixture is obtained by a method comprising:

mixing, in a mixer, the proportionate quantity of the biodegradable waste and the non-biodegradable waste;

grinding, in a first grinder (2), the mixed biodegradable waste and non-biodegradable waste such that the biodegradable waste is grinded to a powdered form and the non-biodegradable waste is grinded to flakes;

extruding, the grinded mixture of the biodegradable waste and the non-biodegradable waste in an extruder (3) wherein, the non-biodegradable waste liquefies and bonds with the biodegradable waste;

grinding, extruded waste in a second grinder (6), into pellets of processed waste.

3. The method as claimed in claim 2 wherein, temperature of the extruder (3) in a region where the grinded mixture of the biodegradable waste and the non-biodegradable waste is fed to the extruder (3), ranges from 100° C. to 350° C.

4. The method as claimed in claim 2 wherein, temperature of a region in the extruder (3) where the non-biodegradable waste bonds with the biodegradable waste ranges from 110° C. to 350° C.

5. The method as claimed in claim 2 wherein, the mould is placed inside the melter (9) for a time period up to 60 minutes.

6. The method as claimed in claim 1 wherein, the proportionate quantity includes up to 50% of biodegradable waste.

7. The method as claimed in claim 1 wherein, density of the processed mixture from the second grinder (6) ranges from 0.1 $g/cm^3$ to 0.5 $g/cm^3$.

8. The method as claimed in claim 1 comprises, uniformly distributing the mixture in the mould placed in the melter (9) by at least one vibrating plate accommodated below the mould.

9. The method as claimed in claim 2 wherein, the grinded mixture of the biodegradable waste and the non-biodegradable waste is compressed in the compression moulding device (10) for a time period up to 60 minutes.

10. The method as claimed in claim 1 wherein, the grinded mixture of biodegradable waste and non-biodegradable waste is extruded in a screw type extruder (3).

11. The method as claimed in claim 1 wherein, the pre-determined temperature ranges from 170° C. to 350° C. and the pre-determined pressure ranges from 0.1 $Kg/cm^2$ to 3 $Kg/cm^2$.

12. The method as claimed in claim 1 wherein, compressing the melted mixture in a compression moulding device includes hot pressing and subsequently cold pressing the melted mixture.

* * * * *